United States Patent [19]
McMillan

[11] 3,742,796
[45] July 3, 1973

[54] CLUSTER BOSS SAW FOR EDGER SAW
[76] Inventor: James R. McMillan, Box 17, Lone Butte, B.C., Canada
[22] Filed: May 6, 1971
[21] Appl. No.: 140,936

[30] Foreign Application Priority Data
May 6, 1970 Great Britain.................. 21,703/70

[52] U.S. Cl.............. 83/102.1, 83/425.4, 83/508.3
[51] Int. Cl............................................. B27b 5/34
[58] Field of Search............ 143/37 R, 37 A, 37 B, 143/33 R; 83/102.1, 425.2, 425.3, 425.4, 508.2, 508.3, 477.1

[56] References Cited
UNITED STATES PATENTS

| | | | |
|---|---|---|---|
| 702,592 | 6/1902 | Roe................................... | 143/37 R |
| 2,149,235 | 2/1939 | Stone................................ | 143/37 R |
| 3,225,800 | 12/1965 | Pease................................ | 143/37 R |
| 3,045,726 | 7/1962 | Grogan.............................. | 143/37 R X |
| 3,093,168 | 6/1963 | Colt et al.......................... | 143/37 R |
| 1,111,331 | 9/1914 | Tower............................... | 143/37 R |

Primary Examiner—Andrew R. Juhasz
Assistant Examiner—James F. Coan
Attorney—Brian J. Wood

[57] ABSTRACT

Gang saw for edger having boss saw which is a cluster of two or more circular saws at fixed spacing. Boss saw is mounted on rotatable shaft with additional saw, saws being independently slidable along shaft. Movable diverter can be aligned with selected saw of cluster so that cluster itself can be used alone as gang saw to produce lumber of fixed width. Fast conversion to gang saw to produce lumber of different width from that produced by cluster.

4 Claims, 5 Drawing Figures

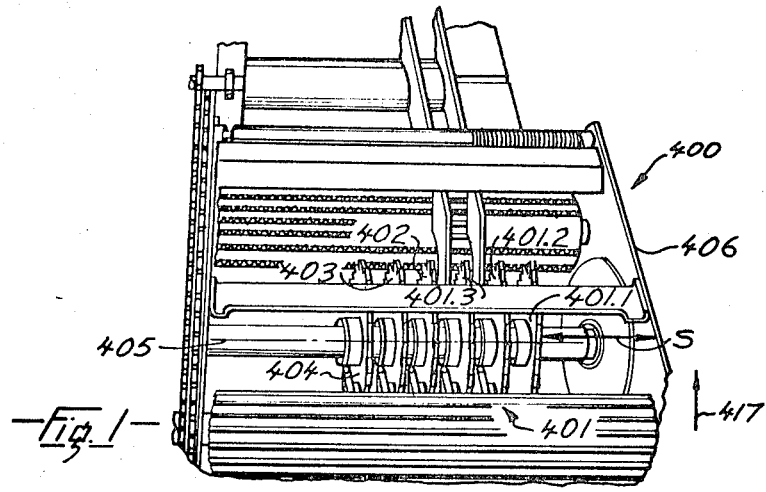
Fig. 1
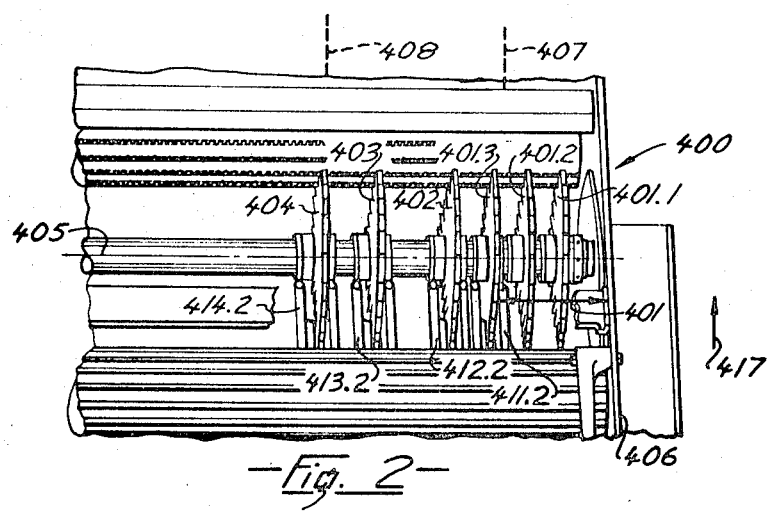
Fig. 2
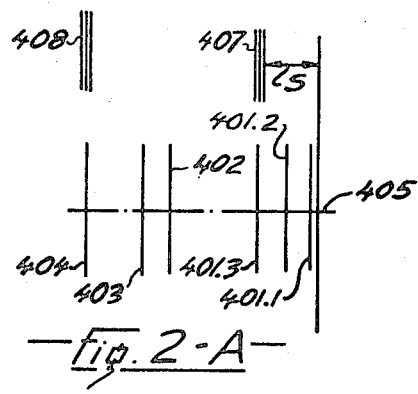
Fig. 2-A

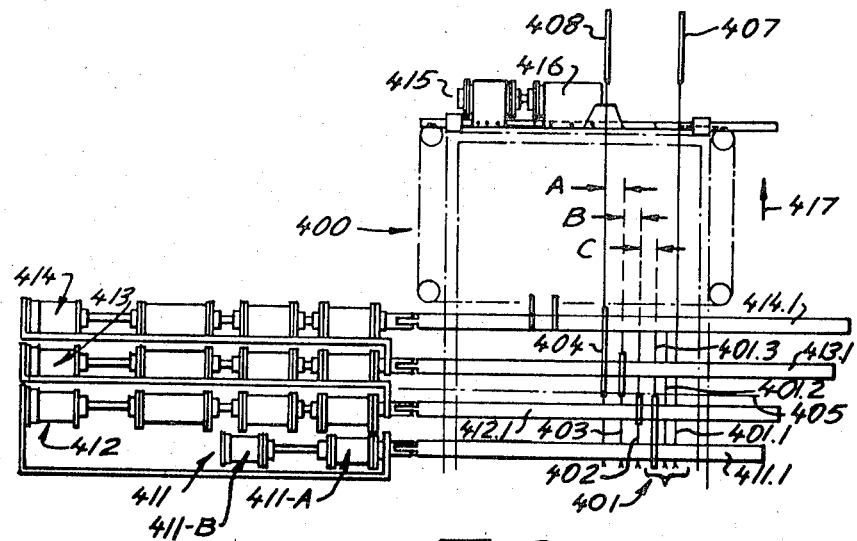
Fig. 3
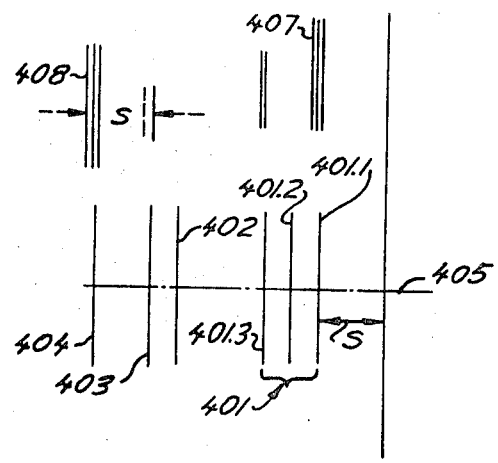
Fig. 3-A

CLUSTER BOSS SAW FOR EDGER SAW

BACKGROUND OF THE INVENTION

FIELD OF THE INVENTION

The invention relates to improvements in sawmill machinery, and to improvements in gang edgers particularly in substitution of a cluster boss for a boss saw.

NOMENCLATURE

Terminology as below listed is used herein.

Flitch
  A timber with parallel sawn top and bottom surfaces and waney edges.

Cant
  A sawn timber produced for instance by removing the waney edges from a flitch, the cant being re-sawn to produce dimensioned stock.

Gang saw
  A series of co-axial circular saws on a common drive shaft, spacing between individual saws of the gang being automatically variable.

Boss saw
  Axial movement of the boss saw moves the whole gang without alteration of spacing between the saws.

Cluster
  Co-axial saws spaced on a common drive shaft, spacing between the saws being fixed — that is to say, change in spacing cannot automatically be effected but such change can be effected, by for instance, installing collars of different sizes so as to alter the spacing. In one exemplification of the present invention, the boss saw rather than being a singular saw is a cluster.

PRIOR ART

In prior art gang saws spacing between individual saws of the gang is adjustable, movement of the boss saw effecting axial translation of all of the saws of the gang without altering the spacing between the individual saws.

SUMMARY OF THE INVENTION

The present invention contemplates a boss saw which is a cluster of two or more saws with means being provided for axial translation of the boss saw cluster, and as well, movement of a movable diverter so that it can be aligned with a selected saw of the cluster. In this way the cluster itself can be used alone as a gang saw, and the apparatus can automatically be converted almost instantaneously to produce lumber having different dimensions than that of the lumber produced by the cluster.

A detailed description, illustrated by drawings, gives exemplification of the invention which, however, can be expressed in mechanism other than that described and illustrated.

DESCRIPTION OF THE DRAWINGS

FIG. 1 is a perspective of a gang edger according to the present invention including a cluster boss saw, FIG. 2 is a perspective generally as FIG. 1 with the boss saw cluster in a different position, FIG. 3 is a schematic plan showing fluid means effecting motion of the saws and of a movable diverter.

FIG. 2-A is a diagram of a set shown in FIG. 2,

FIG. 3-A is a diagram of a set shown in FIG. 3.

DETAILED DESCRIPTION

A gang edger 400 according to the present invention is illustrated in FIGS. 1, 2, and 3. The edger is characterized in that a cant can be cut to produce one or more pieces of dimensioned lumber of a particular size then with a cant of the same size or of a different size, can automatically be set nearly instantaneously to produce stock of different dimensions.

The edger can, for example, be set up to produce 1¾ inch stock then, by pressing a button of an electrical control, set can be changed to produce four by six stock.

DESCRIPTION RELATED TO FIGS. 1, 2, AND 3

FIG. 1

The edger 400 has a number one saw, a boss saw, being a cluster having an outside saw 401.1, a centre saw 401.2, and an inside saw 401.3. The outside, centre, and inside saws being individual saws of the cluster are spaced from one another by a fixed distance.

A number two saw 402, adjacent the inside saw of the cluster, a number three saw 403, and a number four saw 404 are provided, all of the saws including those of the cluster being mounted on and rotating with a driven shaft 405. Spacing between number two saw and the cluster is variable, as is spacing between number three saw and number two saw, and number four saw and number three saw, the saws thus defining a total of five spaces. Number of spaces, viz total number of saws minus one, defines the maximum number of pieces of dimensioned stock that can be produced from a cant. Two of these spaces are between individual saws of the boss cluster 401, and are fixed. The boss saw cluster is movable axially on the driven shaft and, when the boss saw moves all remaining saws also move axially without alteration of the space between them.

When number two saw is moved to alter its spacing from the cluster, that is to say, its spacing from the inside saw 401.3, spacing between number three saw and number two saw, and between number four saw and number three saw, remained unchanged, saws number four and number three moving with saw number two. Similarly, when saw number three is moved to alter its spacing from saw number two, saw number four moves with saw number three so that spacing between four and three remains unchanged. Movement of saw number four alters its spacing from saw number three.

In FIG. 1 the outside saw 401.1 of the cluster is shown spaced a distance S from a frame side member 406.

FIGS. 2 AND 2-A

In FIGS. 2 and 2-A, the boss cluster 401 has been moved to the right adjacent to the frame side member 406 having moved a distance slightly less than S FIG. 1.

Fluid means effecting the movements above are referred to later.

FIGS. 3 and 3-A

In FIGS. 3 and 3-A, a fixed diverter 407 is aligned with the outside of the cluster 401 namely with the saw 401.1. A moving diverter 408 is aligned with the number four saw, namely with saw 404, and follows movements of that saw in the particular set to be described.

A cylinder bank 411 is operatively connected to a set rod 411.1 effecting movement of the boss saw, namely of the cluster 401. Cylinder banks 412, 413, 414, are operatively connected respectively to set rods 412.1, 413.1, 414.1, effecting movement of saws number two, three, four. These are axial movements as before described. Movement of the set rods moves, respectively members 411.2, 412.2, 413.2, 414.2, see FIG. 2, which members respectively move the boss saw cluster and saws number two, three, four. A boss set cylinder bank 411-A, 411-B functions as later described.

Connections are not shown, and except for a modification later described, the cylinder banks and associated mechanism are according to prior art, and therefore, are not described in detail.

A fluid cylinder 415 is operatively connected to the movable diverter 408 and is constructed and arranged, according to the prior art, so that the movable diverter follows saw number four. A further cylinder 416 functions as is later described.

OPERATION

Lumber is fed through the saw in direction of an arrow 417. In FIG. 3 spacing between the inside saw of the boss cluster and saw number two is designated C, being spacing between saws 401.3 and 402. Spacing between number three and number two saws is designated B, being spacing between saws 403 and 402. Spacing between saw number four and saw number three is designated A being spacing between the saws 403 and 404.

To re-saw 20 inch or slightly wider plank or cant having a depth of 2 inches to produce two by 10, two by four, and two by six stock, overall spacing between the boss saw 401.3 and number four saw, 404, is 20 inches with the diverters 407 and 408 spaced accordingly, the fixed diverter being aligned with the saw 401.3. A is set to 10 inches, B to 4 inches, C to 6 inches, set being effected by activating the cylinder banks 412, 412, 414. The outside saw 404 (number four) and 401.3 (the inside saw of the boss cluster) trim any excess or wane to a neat 20 inches with the intermediate saws number two and number three producing the 10, 4, and 6 inch stock. Set above is shown in FIG. 2 with the diverters in broken outline.

The above operation can be accomplished with a prior art edger having a single boss saw rather than a boss saw cluster, and it is seen that in the example above the saws of the boss cluster to the right of the saw 401.3 are not in use. They are, so to speak, in dead storage. It is to be noted that in prior art gang edgers having a single saw rather than a cluster, the boss set cylinder has only two positions, namely with the boss saw coplanar with the fixed diverter 407 and a second position in which saw number two (the saw 402) is aligned with the fixed diverter — the moving diverter following saw number four, the saw 404 at the extreme left.

In the present apparatus the boss cylinder, 411-B, is modified so that either the left hand saw of the cluster, 401.3, or the right hand saw 401.1, can be placed in alignment with the fixed diverter 407 — and the central saw 401.2 can also be so aligned. This is effected by an additional cylinder 411-A.

Since movement of the boss saw cluster is followed by all of the remaining saws of the gang, and since the moving diverter 408 follows the movement of saw number four, the moving diverter also moves by the amount the boss has been moved as above. This is effected by the fluid cylinder 415.

USE OF THE BOSS CLUSTER

The boss cluster illustrated in FIGS. 1 and 2 has three saws spaced at 1¾ inches so that stock one and three quarters in width can be produced using only the saws of the cluster. To effect this, the boss cluster is moved until saw of the cluster, the saw 401.1, is outside placed in alignment with the fixed diverter 407, that is to say the boss cluster has been moved to the left by a distance S. The moving diverter 408 following movement of the saw number four (404) also moves through the distance S. It is necessary then to cause the moving diverter to move independently from this position to a position of alignment with the inside saw of the cluster, namely the cluster saw 401.3. This is accomplished by the set cylinder 416.

We now have the two diverters spaced apart by 3½ inches and accordingly can produce 1¾ inches stock by use only of the saws of the cluster operating as a gang edger. This set is not shown.

If now it is required to cut a 20 inch plank producing stock as described above, by means of a control not shown, the set originally described is recovered at once. Solenoid valve and fluid connections to effect all of the foregoing are not described, being according to known construction.

From the foregoing example it is seen that construction.

according to the invention can be used to cut stock to produce dimensioned lumber of a particular size as exemplified by producing the 1¾ inch stock, and that the set can automatically be changed to another set producing, as in the example above, 4, 6, and 10 inch from a 20 inch cant. In one case the cluster alone is used, and in the other the left hand saw of the cluster operates as a boss saw with remaining saws of the boss cluster not being used.

In all of the operations one saw of the boss cluster always is aligned with the fixed diverter. The moving diverter is aligned with one saw, namely with an inside saw whether of the cluster or of the gang, space between the diverters defining desired neat width.

While the use only of the cluster, and then of one saw of the cluster together with remaining saws of the gang, is described above, it is clear that all saws can be used at one time if required. It is also to be noted that the cluster can have two or more saws, and that the remaining saws of the gang can be more or less than the number of saws illustrated.

I claim:

1. A gang saw having a boss saw and at least one additional circular saw (402), the saws being mounted on a rotating shaft and being adapted for motion of translation along the shaft, wherein
    a. the boss saw (401) is a cluster of at least two circular saws (401.1, 401.3) spacing between the saws of the boss cluster being fixed; the two saws being an outside saw (401.3) adjacent the additional saw, and an inside saw (401.1),
    b. a fixed diverter
    c. means (411, 412.1) to move the additional saw axially of the shaft, so as to alter its spacing from the boss cluster,
    d. means (411, 411.1) to move the boss cluster axially of the shaft, the additional saw moving equally therewith, so that any selected saw of the boss cluster can be aligned with the fixed diverter, e. a movable diverter (408), f. means (415, 416) to move the movable diverter to align it with the additional saw at a particular spacing from the fixed diverter, constructed and arranged so that a cant having a width somewhat greater than the spacing between the fixed and movable diverters is trimmed to a width according to that spacing, and is also cut longitudinally to produce at least two pieces of dimensioned lumber when the inner saw of the cluster is aligned with the fixed diverter; and so that either the trimmed cant or the dimensioned lumber can be produced at will according to which saw of the boss cluster is aligned with the fixed diverter.

2. A gang saw as defined in claim 1, wherein the boss cluster has more than two saws (eg. 401, 402, 403), and wherein there are at least two additional saws (eg. 402, 403), and g. means (eg. 411, 411.1, 411.2) to alter the spacing between the additional saws h. means as aforesaid to move the boss cluster, the additional saws moving therewith, constructed and arranged so that dimensioned pieces can selectively be produced from the cant in a maximum number equal to the total number of saws minus one, the number of pieces and their dimensions being determined by depth of the cant, spacing between the saws, and position of the diverters.

3. A gang saw as defined in claim 2, and means (416) to move the movable diverter independently to a position of alignment with a selected saw of the boss cluster.

4. A gang saw as defined in claim 3, wherein the means to move the boss cluster so that a selected saw of the cluster is aligned, as aforesaid, with the fixed diverter includes; a boss cylinder (411-B), and an independently operable additional cylinder (411-A).

* * * * *